April 6, 1926.  1,580,067

H. MILLER

PISTON RING

Filed July 11, 1923

H. Miller, Inventor

By C. A. Snow & Co.

Attorney

Patented Apr. 6, 1926.

1,580,067

UNITED STATES PATENT OFFICE.

HARRY MILLER, OF ST. LOUIS, MISSOURI.

PISTON RING.

Application filed July 11, 1923. Serial No. 650,924.

*To all whom it may concern:*

Be it known that I, HARRY MILLER, a citizen of the United States, residing at St. Louis, in the State of Missouri, have invented a new and useful Piston Ring, of which the following is a specification.

The device forming the subject matter of this application is a piston ring, and one object of the invention is so to construct the ring and so to mount the same in the piston of an engine that, when compression exists at one end of the piston, the ring will be forced outwardly thereby causing the ring to co-operate with the wall of the cylinder, even though the wall may be slightly out of round. Another object of the invention is to provide means under the control of an operator, whereby the ring may be expanded from the end of the piston, without withdrawing the piston from the cylinder.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

Figure 1:
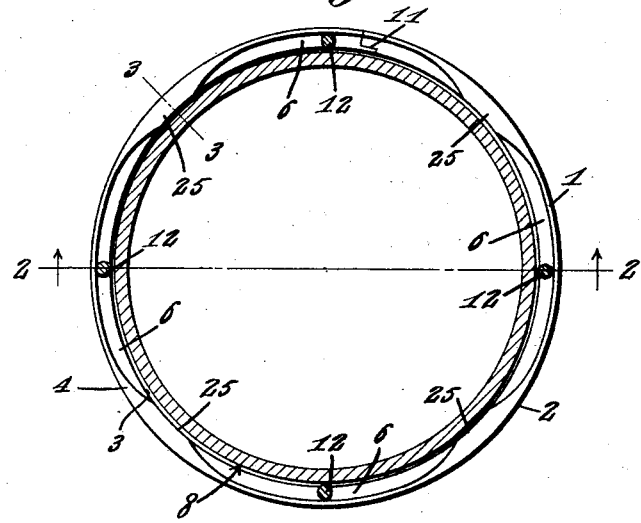
Figure 2:
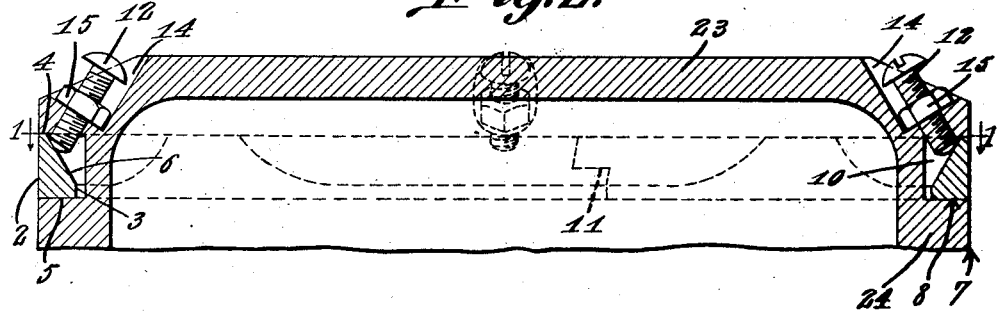
Figure 3:
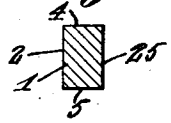

In the accompanying drawings:

Figure 1 shows in transverse section, the piston of an internal combustion engine, wherewith, the device forming the subject matter of this application has been assembled; Figure 2 is a section on the line 2—2 of Figure 1, the line 1—1 in Figure 2 denoting the cutting plane on which Figure 1 is taken; Figure 3 is a section taken through the ring on the line 3—3 of Figure 1.

In carrying out the invention, there is provided a piston ring 1 having an outer surface 2 and an inner surface 3, the surfaces being disposed parallel to each other. The ring 1 has end surfaces 4 and 5 which are disposed parallel to each other and at right angles to the surfaces 2 and 3. The outer surface 2 is of much greater area than the inner surface 3, and the end surface 5 is of much greater area than the end surface 4. The ring 1 has inclined faces 6 extended between the inner edges of the end surface 4 and the inner surface 3 and disposed at an acute angle to the outer surface 2 of the ring. At any desired number of circumferentially spaced points, the ring 1 has inwardly projecting reinforcing and sustaining lugs 25.

The numeral 7 denotes a piston including a side wall 24 and a head 23. A circumferential groove 8 is formed in the wall 24, and therein the ring 1 is mounted, the small end surface 4 of the ring being disposed adjacent to the head 23 of the piston, which receives the compression, the inclined surface 6 of the ring cooperating with two walls of the groove 8 to define an annular chamber 10, into which the compressed gas is adapted to enter, thereby to work an automatic expansion of the ring 1 and to cause the ring to cooperate with the wall of the cylinder wherein the piston 7 reciprocates, even though the internal cross section of the cylinder be other than a true circle. The ends of the ring 1 may be halved together, as indicated at 11, or be overlapped in any other suitable way.

A means is provided whereby, at the will of an operator, the ring may be expanded from the compression chamber of the cylinder, it being unnecessary to remove the piston from the cylinder in order to effect an expansion of the ring. Having this consideration in mind, adjusting devices 12 are mounted in the piston and operate in recesses 14 fashioned in the edge of the head 23, the adjusting devices being in the form of screws, if desired, threaded into the piston and entering the annular chamber 10, the inner ends of the screws bearing on the inclined surfaces 6 of the piston ring, the screws being held in adjusted positions by means of lock nuts 15, which, being threaded upon the screws, bear on the piston at the bases of the recesses 14. By rotating the screws 12, the ring 1, obviously, may be forced outwardly so as to cooperate with the wall of the cylinder.

I claim:

1. In a device of the class described, a piston, a ring thereabout, and members for expanding the ring, said members being mounted in the piston at an angle to the axis of the piston and being accessible from that end of the piston which receives the compression, the ring having an inclined surface, and the disposition of said members at an angle to the axis of the piston permitting said members to engage the inclined surface of the ring at such an angle that said members expand the ring by thrust, rather than by wedging action.

2. In a device of the class described, a piston, a ring thereabout, and screws threaded into the piston and disposed acutely with respect to the axis of the piston, the screws cooperating with the ring to expand it.

3. A device of the class described, constructed as set forth in claim 2 and further characterized by lock nuts on the screw, and engaging the piston, the piston having recesses for the reception of the nuts and the outer portions of the screws.

In testimony that I claim the foregoing as my own, I have hereto affixed my signature.

HARRY MILLER.